United States Patent
Ishiyama

(10) Patent No.: US 10,863,609 B2
(45) Date of Patent: Dec. 8, 2020

(54) X-RAY HIGH VOLTAGE APPARATUS, POWER SUPPLY APPARATUS, AND X-RAY IMAGING APPARATUS

(71) Applicant: CANON MEDICAL SYSTEMS CORPORATION, Otawara (JP)

(72) Inventor: Fumio Ishiyama, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/542,743

(22) Filed: Aug. 16, 2019

(65) Prior Publication Data

US 2020/0068694 A1 Feb. 27, 2020

(30) Foreign Application Priority Data

Aug. 22, 2018 (JP) ................................. 2018-155424

(51) Int. Cl.
| | |
|---|---|
| *H05G 1/20* | (2006.01) |
| *H02M 5/458* | (2006.01) |
| *H05G 1/12* | (2006.01) |
| *H02M 1/44* | (2007.01) |
| *G01N 23/04* | (2018.01) |
| *H02M 3/158* | (2006.01) |

(52) U.S. Cl.
CPC ............... *H05G 1/20* (2013.01); *G01N 23/04* (2013.01); *H02M 1/44* (2013.01); *H02M 3/158* (2013.01); *H02M 5/458* (2013.01); *H05G 1/12* (2013.01)

(58) Field of Classification Search
None
See application file for complete search history.

(56) References Cited

U.S. PATENT DOCUMENTS

| | | | |
|---|---|---|---|
| 2017/0317599 A1* | 11/2017 | Satoh ...................... | H02M 3/28 |
| 2018/0278149 A1* | 9/2018 | Sano ................... | H02M 1/4225 |
| 2018/0350513 A1* | 12/2018 | Murakami .......... | H01F 27/2823 |

FOREIGN PATENT DOCUMENTS

JP 5-219726 A 8/1993

* cited by examiner

*Primary Examiner* — Hoon K Song
(74) *Attorney, Agent, or Firm* — Oblon, McClelland, Maier & Neustadt, L.L.P.

(57) ABSTRACT

According to one embodiment, an X-ray high voltage apparatus includes an AC/DC converter, an inverter circuit, a high voltage generator, a power storage device, and the DC/DC converter. The AC/DC converter converts an AC voltage into a DC voltage. The inverter circuit converts the DC voltage into an AC voltage. The high voltage generator externally outputs a power obtained by boosting and rectifying the AC voltage outputted by the inverter circuit. The DC/DC converter receives the DC voltage, and charges and discharges the power storage device. The DC/DC converter is a multi-phase converter including DC/DC converter blocks. Each of the DC/DC converter blocks includes a choke coil. The choke coil is provided with a correction winding for correcting a deviation of a magnetic flux caused by a DC current superimposed on the corresponding choke coil. The correction windings are applied with a summed current based on the DC/DC converter.

9 Claims, 8 Drawing Sheets

X-RAY HIGH VOLTAGE APPARATUS, POWER SUPPLY APPARATUS, AND X-RAY IMAGING APPARATUS

CROSS-REFERENCE TO RELATED APPLICATIONS

This application claims the benefit of priority of Japanese Patent Application No. 2018-155424, filed Aug. 22, 2018, the entire contents of which are incorporated herein by reference.

FIELD

Embodiments described herein relate generally to an X-ray high voltage apparatus, a power supply apparatus, and an X-ray imaging apparatus.

BACKGROUND

An X-ray imaging apparatus such as an X-ray diagnostic apparatus and an X-ray CT (Computed Tomography) apparatus may be installed at a medical treatment facility located in a building in urban areas. In this type of medical treatment facility, even when there is a need to replace the X-ray imaging apparatus with something more sophisticated than before, there may be cases where it cannot be replaced due to the restrictions regarding power supply, or where the performance of the replaced apparatus cannot be fully realized even if it is replaced.

However, it is not easy to increase the power supply capacity of a commercial AC power supplying power to the X-ray high voltage apparatus. In this context, X-ray imaging apparatuses of power assist type have been developed in which, prior to an X-ray irradiation, energy is stored in advance in a power storage device such as a battery, an electrolytic capacitor, and an electric double layer capacitor, whereby shortage of the power of the AC power supply is compensated to increase peak power when irradiating X-rays.

These X-ray imaging apparatuses of power assist type include the power storage device to store energy such as the battery, the electrolytic capacitor, and the electric double layer capacitor, and include a DC/DC converter to control charging and discharging of the power storage device. Before irradiating X-rays, the AC voltage from the AC power supply is converted to a DC voltage by an AC/DC converter, and is stepped down by the DC/DC converter to store power in the power storage device. When irradiating X-rays, a DC voltage of the power storage device is discharged and boosted by the DC/DC converter, and is supplied to an X-ray high voltage power supply together with the DC voltage output of the AC/DC converter.

It is desirable to place the power storage device and the DC/DC converter near the X-ray high voltage power source, which requires a large power. The X-ray high voltage power supply is mounted on the rotating frame in the case of the X-ray CT apparatus, and it is desirable that the power storage device and the DC/DC converter are also mounted on the rotating frame. This is because the X-ray imaging apparatus installed in the urban building is important to be small and to have a small footprint. Installing the power storage device and the DC/DC converter on the fixed frame will increase the installation area of the X-ray imaging apparatus, and increase the size of the slip ring mechanism for transferring power from the fixed frame to the rotating frame, and hence, have adverse effects on the downsizing of the X-ray imaging apparatus.

Recently, the performance of the power storage devices has been improved to realize downsizing, and some of them have volumes that is able to be mounted on the rotating frame. However, the DC/DC converter is still difficult to mount on the rotating frame because of the size of choke coils included in the DC/DC converter, and thus, it is still difficult to mount both the power storage device and the DC/DC converter on the rotating frame.

DETAILED DESCRIPTION

Hereinbelow, a description will be given of an X-ray high voltage apparatus, a power supply apparatus, and an X-ray imaging apparatus, according to embodiments of the present invention with reference to the drawings.

In general, according to one embodiment, the X-ray high voltage apparatus includes an AC/DC converter, an inverter circuit, a high voltage generator, a power storage device, and the DC/DC converter. The AC/DC converter converts an AC voltage into a DC voltage. The inverter circuit converts the DC voltage outputted by the AC/DC converter into an AC voltage. The high voltage generator externally outputs a power obtained by boosting and rectifying the AC voltage outputted by the inverter circuit. The DC/DC converter receives the DC voltage outputted by the AC/DC converter, and charges and discharges the power storage device. The DC/DC converter is a multi-phase converter that includes a plurality of DC/DC converter blocks. Each of the plurality of DC/DC converter blocks includes a choke coil. The choke coil is provided with a correction winding for correcting a deviation of a magnetic flux caused by a DC current superimposed on the corresponding choke coil. The correction windings are applied with a summed current based on the DC/DC converter.

(1) Overall Configuration

Figure 1:
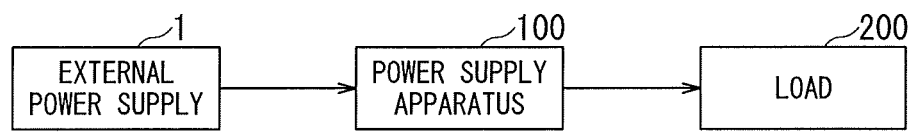
FIG. 1 is a block diagram showing an example of a power supply system including a power supply apparatus according to an embodiment.

FIG. 1 is a block diagram showing an example of the power supply system including the power supply apparatus 100 according to an embodiment. As shown in FIG. 1, the power supply apparatus 100 generates a power to supply to the load 200 by using an AC power inputted from a commercial power supply (external power supply) 1.

Hereinafter, the X-ray high voltage apparatus 100 will be described as an example of the power supply apparatus 100.

(2) Schematic Configuration of X-Ray High Voltage Apparatus

Figure 2:
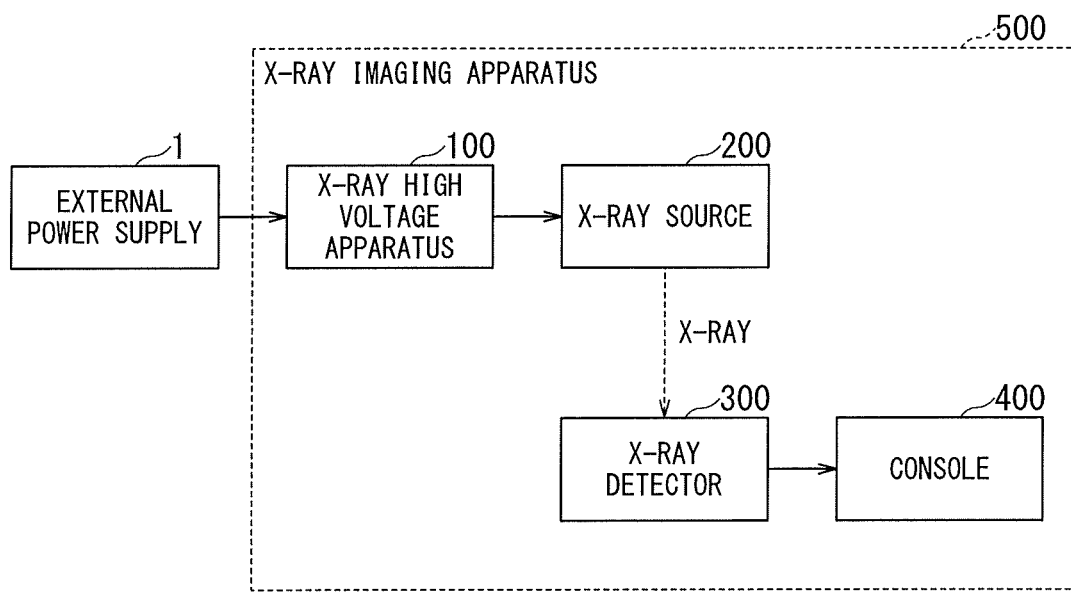
FIG. 2 is a block diagram showing an example of an X-ray imaging apparatus including an X-ray high voltage apparatus as the power supply apparatus.

FIG. 2 is a block diagram showing an example of the X-ray imaging apparatus 500 that includes the X-ray high voltage apparatus 100 as the power supply apparatus. The X-ray imaging apparatus 500 includes, for example, an X-ray diagnostic apparatus and an X-ray CT apparatus. As shown in FIG. 2, the X-ray imaging apparatus 500 has an X-ray source 200, an X-ray detector 300, and a console 400 in addition to the X-ray high voltage apparatus 100. The X-ray source 200 may include an X-ray tube. The X-ray source 200 receives an output power of the X-ray high voltage apparatus 100 to generate X-rays, and irradiates the generated X-rays to the object. The X-ray detector 300 detects the X-rays passing through the object, and outputs an electrical signal corresponding to the detected X-rays to the console 400. The console 400 controls the X-ray source 200 and the X-ray detector 300, and generates an X-ray image of the object based on the output signal of the X-ray detector 300.

Figure 3:
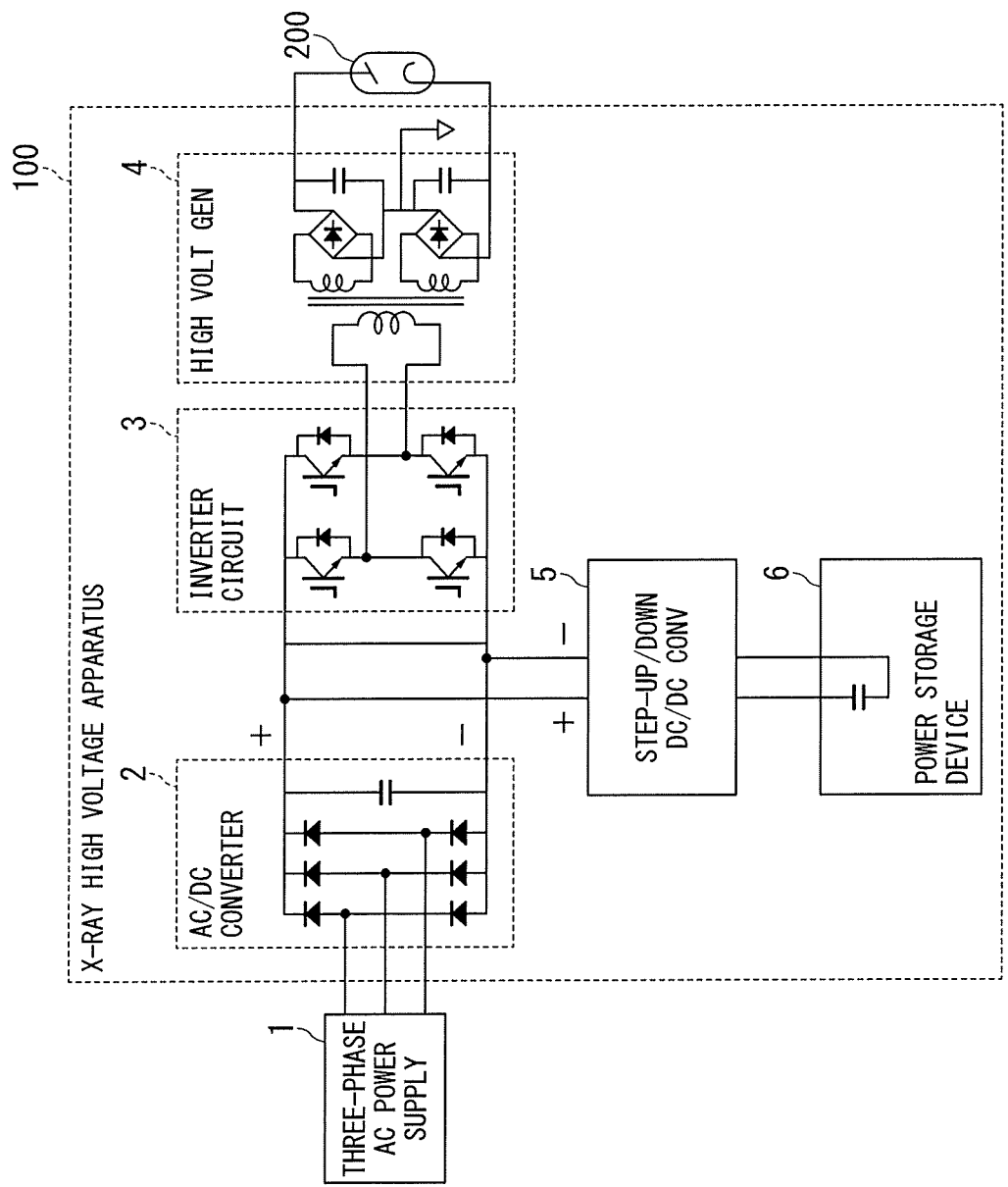
FIG. 3 is a block diagram showing an example of the X-ray high voltage apparatus.

FIG. 3 is a block diagram showing an example of the X-ray high voltage apparatus 100. The three-phase AC voltage input from the three-phase AC power supply 1 is rectified by the AC/DC converter 2 and converted to a DC voltage. For example, when the voltage of the three-phase AC power supply 1 is 400V, the output voltage of the AC/DC converter 2 is 400√2V, i.e., approximately 560V. The inverter circuit 3 converts the DC voltage outputted by the AC/DC converter 2 into a high frequency AC voltage. The high voltage generator 4 boosts and rectifies the high frequency AC voltage outputted by the inverter circuit 3, and outputs a high DC voltage to an external load (for example, an X-ray tube) 200. When a high DC voltage output from the high voltage generator 4 is applied to the X-ray tube 200, X-rays are generated by the X-ray tube 200.

A step-up/down type DC/DC converter 5 is connected to a DC voltage line that is supplied from the AC/DC converter 2 to the inverter circuit 3. Also, a power storage device 6 is connected to the step-up/down type DC/DC converter 5.

Figure 4:
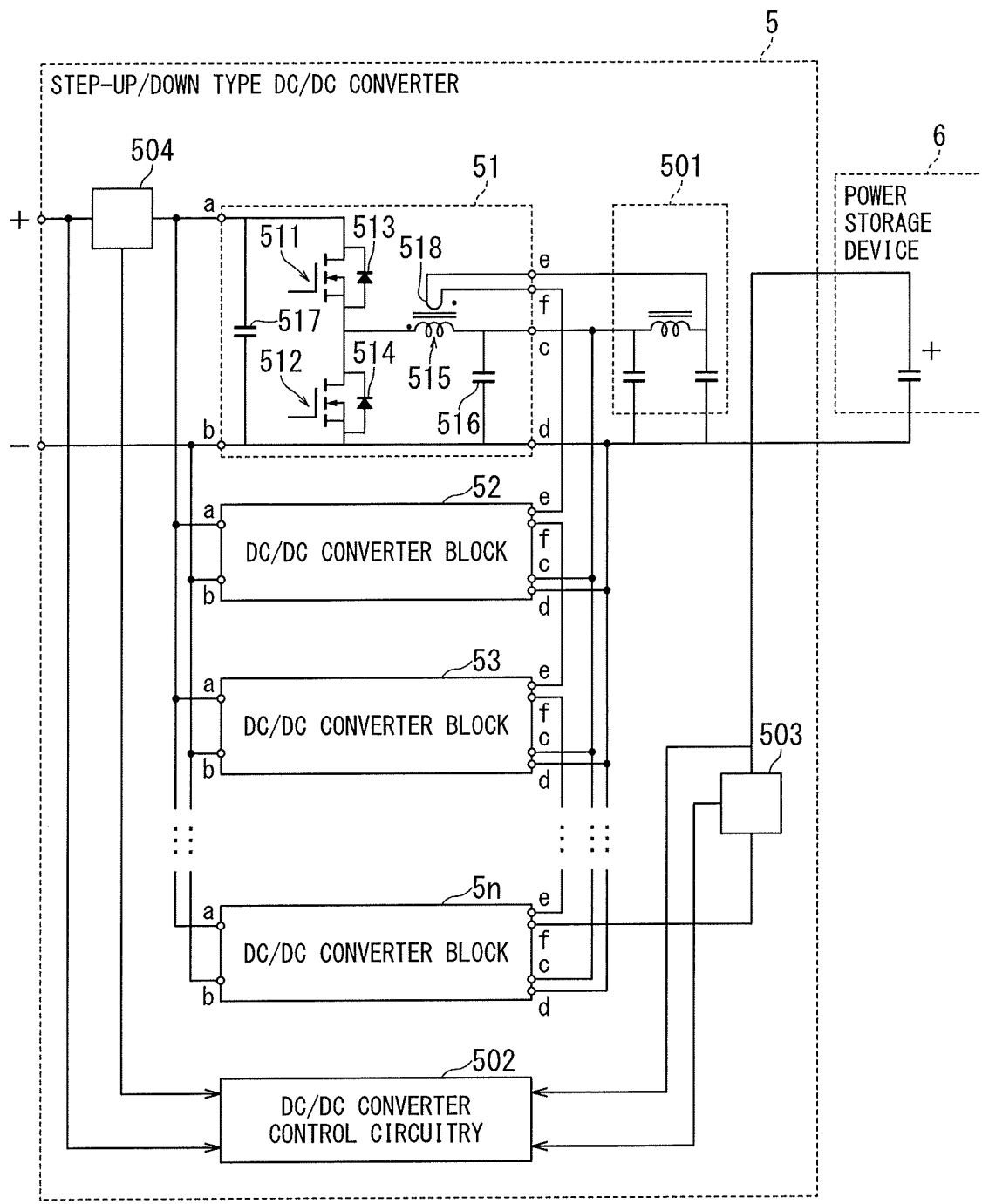
FIG. 4 is an explanatory diagram showing an example of a step-up/down type DC/DC converter in FIG. 3 and an example of a connection between the step-up/down type DC/DC converter and a power storage device.

FIG. 4 is an explanatory diagram showing an example of a step-up/down type DC/DC converter 5 in FIG. 3 and an example of a connection between the step-up/down type DC/DC converter 5 and a power storage device 6.

The step-up/down type DC/DC converter 5 includes n (Where n is a positive integer) DC/DC converter blocks 51 to 5n, a filter circuit 501, a DC/DC converter control circuitry 502, a current detection circuit 503, and a current detection circuit 504.

The filter circuit 501 may be formed of an LC filter, and removes high frequency noise components from the outputs of DC/DC converter blocks 51-5n. The step-up/down type DC/DC converter 5 may not include the filter circuit 501.

The DC/DC converter control circuitry 502 receives the input and output voltages of the DC/DC converter blocks 51 to 5n, receives the current detection signal output from the current detection circuits 503 and 504, and also receives signals from the control circuit (not shown), and controls on/off of MOSFETs in the DC/DC converter blocks 51 to 5n.

(3) Operation when Charging Power Storage Device 6

Next, an operation of the step-up/down type DC/DC converter 5 when charging the power storage device 6 will be described with the DC/DC converter block 51. The other DC/DC converter blocks 52 to 5n have the same configuration and function as the DC/DC converter block 51, and thus the description thereof is omitted.

Charging of the power storage device 6 is preferably performed when X-rays are not irradiated, but when the X-ray intensity is weak and the input power capacity has a room, the power storage device 6 may be charged during the X-ray irradiation.

The output DC voltage about 560V of the AC/DC converter 2 is applied via the current detection circuit 504 to the DC/DC converter block 51 with the terminal a thereof as positive and the terminal b as negative.

When charging the power storage device 6, the DC/DC converter control circuitry 502 controls the MOSFET 511 in the DC/DC converter block 51 to perform switching operation. When the MOSFET 511 is on, the current flowing into the DC/DC converter block 51 passes through the capacitor 517 to the MOSFET 511, the main winding of the choke coil 515, and the capacitor 516 to return to the capacitor 517. The terminal voltage of the capacitor 517 does not continue to decrease, because the current flowing out of the capacitor 517 is externally supplied via the terminals a and b of the DC/DC converter block 51.

When the MOSFET 511 turns off, the current in the main winding of the choke coil 515 flows through the capacitor 516 and the diode 514, and returns to the main winding of the choke coil 515. As a result, a DC voltage is output from the output terminals c and d of the DC/DC converter block 51 with the terminal c as a positive terminal. Although the current flows into the capacitor 516, the terminal voltage of the capacitor 516 does not continue to increase, because the current is output to the outside through the terminals c and d of the DC/DC converter block 51.

Now, let the on time (duration) of the MOSFET 511 be Ton1, the off time of the MOSFET 511 be Toff1, the voltage between the terminals a and b of the DC/DC converter block 51 be an input voltage Vin with the terminal a as positive, and the voltage between the terminals c and d be an output voltage Vout with the terminal c as positive. The output voltage Vout can be expressed as the following equation (1) in the continuous conduction mode.

$$V_{out} = \frac{T_{on}1}{T_{on}1 + T_{off}1} \cdot V_{in} = \frac{T_{on}1}{T} \cdot V_{in} \quad (1)$$

In equation (1), T denotes the switching period of the MOSFET 511, where T=Ton1+Toff1. The relationship between the switching period T and the on time Ton1 of the MOSFET 511 is T>Ton1. The DC/DC converter block 51 therefore operates as a step-down DC/DC converter that reduces the voltage input from the terminals a and b and outputs the reduced voltage to the terminals c and d.

The output of the DC/DC converter block 51 is applied to the power storage device 6 via the filter circuit 501, the terminals e and f of the DC/DC converter blocks 51 to 5*n*, and the current detection circuit 503. In the following description, an example in which the voltage drop in a path of the filter circuit 501, the terminals e and f of the DC/DC converter blocks 51 to 5*n*, and the current detection circuit 503 is ignored, and the output voltage of the DC/DC converter block 51 is applied to the power storage device 6.

The terminal voltage of the power storage device 6 is increased by charging the power storage device 6. However, the power storage device 6 can be charged with a constant current by performing feedback control using the output signal of the current detection circuit 503. The output voltage of the step-up/down type DC/DC converter 5 is equal to the terminal voltage of the power storage device 6. The ratio of the on time Ton1 of the MOSFET 511 to the switching cycle T of the MOSFET 511 gradually increases with the increase of the terminal voltage Vout according to the equation (1), whereby a constant current is maintained.

Since the output voltage of the step-up/down type DC/DC converter 5 is the same as the voltage of the power storage device 6, the completion of charging of the power storage device 6 can be detected by the DC/DC converter control circuitry 502 monitoring the output voltage of the step-down DC/DC converter 5. For example, when the voltage of the power storage device 6 reaches a voltage (for example, 450V) lower by a predetermined voltage than the input voltage 560V, it is determined that charging is completed, and the switching operation of the MOSFET 511 is stopped.

The operation of the circuit formed by the terminals e and f of the DC/DC converter block 51 will be described later with reference to FIG. 12.

The operation of the DC/DC converter blocks 52-5*n* is similar to that of the DC/DC converter block 51. The plurality of DC/DC converter blocks 51-5*n* operate as a multi-phase converter. Specifically, when the number of the plurality of DC/DC converter blocks is n, the operation phase of each block (the switching phase of the MOSFET) is shifted by 2π/n [rad].

(4) Operation when Taking Energy Out of Power Storage Device

Next, an operation of the step-up/down type DC/DC converter 5 when taking out energy from the power storage device 6 will be described with the DC/DC converter block 51.

Energy extraction from the power storage device 6 is usually performed at the time of X-ray irradiation where a large amount of power is required. When taking out energy from the power storage device 6, the step-up/down type DC/DC converter 5 operates as a step-up DC/DC converter.

When taking out energy from the power storage device 6, the input terminals of the DC/DC converter block 51 are the terminals c and d with the terminal c as positive, unlike when charging the power storage device 6, and the output terminals of the DC/DC converter block 51 are the terminals a and b with the terminal a as positive.

The voltage of the power storage device 6 is applied to the terminals c and d of the DC/DC converter block 51 via the current detection circuit 503, the terminals f and e of the DC/DC converter blocks 51 to 5*n*, and the filter circuit 501.

When energy is taken from the power storage device 6, the DC/DC converter control circuitry 502 controls the MOSFET 512 in the DC/DC converter block 51 to perform switching operation. When the MOSFET 512 is on, the current flowing into the DC/DC converter block 51 passes through the main winding of the choke coil 515 and the MOSFET 512 to return to the capacitor 516. The terminal voltage of the capacitor 516 does not continue to decrease, because the current flowing out of the capacitor 516 is supplied from the power storage device 6 via the input terminals c and d.

When the MOSFET 512 turns off, the current in the main winding of the choke coil 515 flows through the diode 513, the capacitor 517 and the capacitor 516 and returns to the main winding of the choke coil 515. The terminal voltage of the capacitor 517 does not keep rising, because the current flowing into the capacitor 517 is output to the outside through the terminals a and b of the DC/DC converter block 51.

Here, let the on time of the MOSFET 512 be Ton2, the off time of the MOSFET 512 be Toff2, the voltage between the terminals c and d be an input voltage Vin with the terminal c as positive, and the voltage between the terminals a and b be an output voltage Vout with the terminal a as positive. The output voltage Vout can be written down as the following equation (2) in the continuous conduction mode.

$$V_{out} = \frac{1}{1 - \frac{T_{on}2}{T_{on}2 + T_{off}2}} \cdot V_{in} = \frac{1}{1 - \frac{T_{on}2}{T}} \cdot V_{in} \quad (2)$$

In equation (2), T denotes the switching period of the MOSFET 512, where T=Ton2+Toff2. The relationship between the switching period T and the on time Ton2 of the MOSFET 512 is T>Ton2. The DC/DC converter block 51 therefore operates as a step-up DC/DC converter that raises the input voltage and outputs the raised voltage.

The DC/DC converter control circuitry 502 can control the power supplied from the step-up/down type DC/DC converter 5 to the inverter circuit 3 (see FIG. 3) by monitoring the output signal of the current detection circuit 504 and the output voltage of the step-up/down type DC/DC converter 5 and controlling on and off of the MOSFET 512. Therefore, the DC/DC converter control circuitry 502 can control the ratio of the power supplied from the AC/DC converter 2 to the inverter circuit 3 to the power supplied from the step-up/down type DC/DC converter 5 to the inverter circuit 3 at the time of X-ray irradiation. For example, when the power supplied from the AC/DC converter 2 is 50 kW and the power supplied from the step-up/down type DC/DC converter 5 is 50 kW, the inverter circuit 3 can be supplied with 100 kW, and thus, power exceeding the power supply capacity of the power supply 1 can be easily supplied to the X-ray tube 200.

During X-ray irradiation, the terminal voltage of the power storage device 6 is gradually decreased due to discharge. Meanwhile, the DC/DC converter control circuitry 502 performs control to maintain the output current of the step-up/down type DC/DC converter 5 in accordance with the output signal of the current detection circuit 504. Hence, constant power can be taken out from the power storage device 6 by gradually increasing the ratio of the on time Ton2 to the switching period T of the MOSFET 512.

The plurality of the DC/DC converter blocks 51 to 5n may operate as the multi-phase converter when operating as a step-up DC/DC converter.

Although FIG. 4 shows an example in which the step-down type DC/DC converter (first DC/DC converter) that charges the power storage device and the step-up DC/DC converter (second DC/DC converter) that takes out the energy charged in the power storage device are configured by the single step-up/down type DC/DC converter 5 having both functions therein, these functions may be realized by the separated circuits. In this case, the correction winding 518 (details of which will be described below) provided in the choke coil 515 according to the present embodiments and the operation thereof may be implemented by either one or both separated circuits. That is, when the step-down DC/DC converter and the step-up DC/DC converter are provided as separate circuits, only the step-up DC/DC converter may have n converter blocks and operate as the multi-phase converter, and the correction winding 518 of corresponding choke coil provided in each converter block of the step-up DC/DC converter may be operated only during X-ray irradiation, for example.

(5) DC Current Superimposed on Choke Coil

Next, the configuration and operation of the correction winding 518 will be described. The DC current superimposed on the choke coil of the DC/DC converter will be described.

(5-1) Operating as Step-Down DC/DC Converter (Buck Converter)

Figure 5:
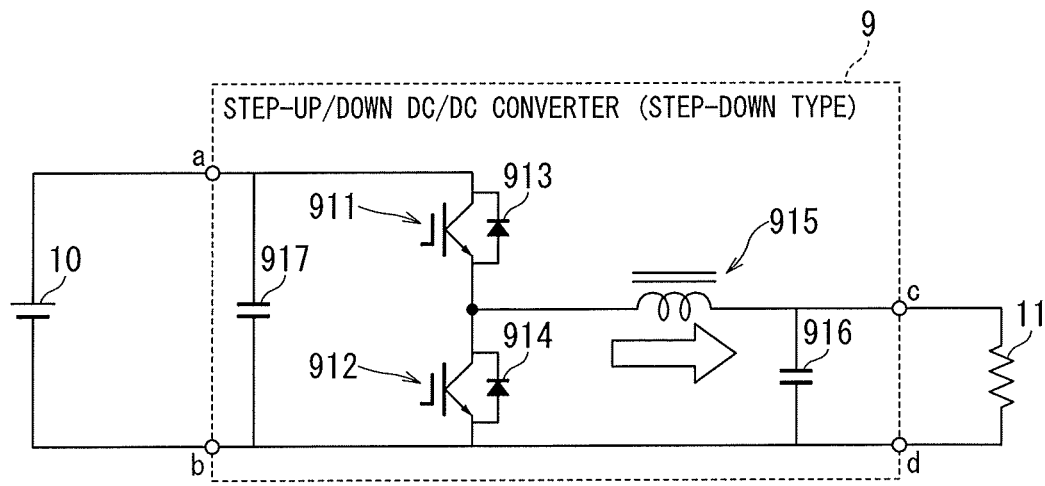
FIG. 5 is an explanatory diagram showing how a general step-up/down type converter operates as a step-down type DC/DC converter.

FIG. 5 is an explanatory diagram showing how a general step-up/down type converter operates as the step-down type DC/DC converter.

An exemplary circuit simply composed of a step-up/down type DC/DC converter 9, a DC power supply 10, and a load resistor 11 will be described with reference to FIGS. 5-10 in the following description.

Similar to the DC/DC converter block 51 shown in FIG. 4, the step-up/down type DC/DC converter 9 operates as a step-down DC/DC converter by the switching operation of the MOSFET 911, and operates as a step-up DC/DC converter by the switching operation of the MOSFET 912. When operating as the step-down DC/DC converter, terminals a and b are input terminals, and terminals c and d are output terminals, and when operating as the step-up DC/DC converter, terminals c and d are input terminals and the terminals a and b are output terminals, as in the DC/DC converter blocks 51 to 5n shown in FIG. 4.

Figure 6:
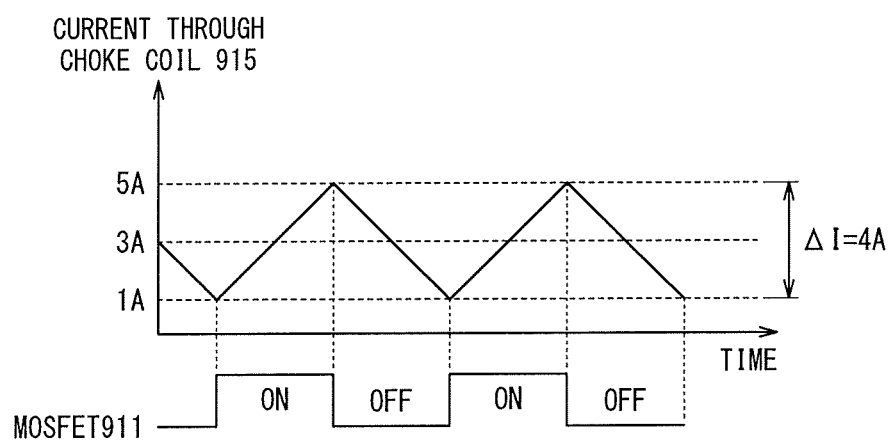
FIG. 6 is an explanatory diagram showing an example of a relationship between the current through a choke coil and a switching timing of a MOSFET when the step-up/down type converter operates as the step-down type DC/DC converter.

FIG. 6 is an explanatory diagram showing an example of a relationship between the current through the choke coil 915 and a switching timing of the MOSFET 911 when the step-up/down type converter 9 operates as the step-down type DC/DC converter. FIG. 6 shows an example of a waveform of a current through the choke coil 915 in a steady state where the ratio Ton/T of the on time of the MOSFET 911 to the switching period is 0.5 and the output current is 3 A.

In this case, when the voltage of the DC power supply 10 is 560V, the input voltage Vin of the step-up/down type DC/DC converter 9 is 560V and the output voltage Vout is 280V. The current of the choke coil 915 increases linearly when the MOSFET 911 is on. The increase ΔI of the output current can be expressed as the following equation (3).

$$\Delta I = \frac{V_{in} - V_{out}}{L} \cdot T_{on} \quad (3)$$

In equation (3), L denotes inductance of the choke coil 915 and Ton denotes the on time of the MOSFET 911.

Similarly, when the MOSFET 911 is off and let the off time of the MOSFET 911 be Toff, the amount of change ΔI of the output current can be expressed as the following equation (4).

$$\Delta I = -\frac{V_{out}}{L} \cdot T_{off} \quad (4)$$

That is, the output current decreases linearly when the MOSFET 911 is off, and thus, the current of the choke coil 915 is a triangular wave as shown in FIG. 6. For example, when the inductance of the choke coil 915 is designed such that ΔI is 4 A, the current through the choke coil 915 changes between 1 A and 5 A (see FIG. 6).

Figure 7:
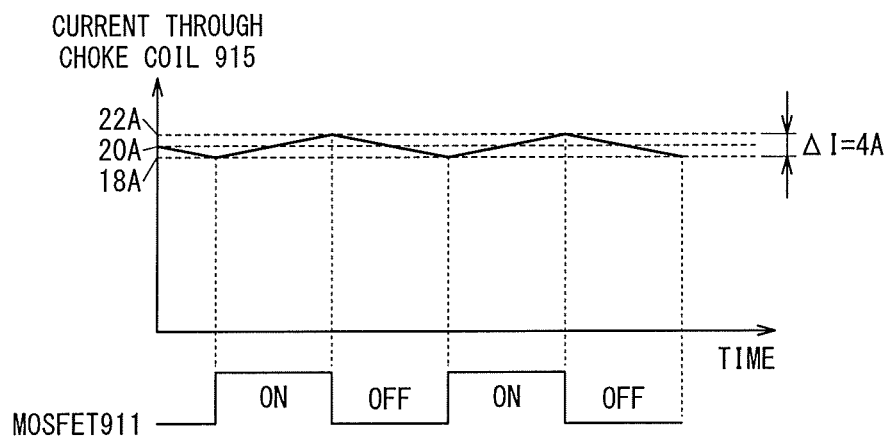
FIG. 7 is an explanatory diagram showing an example of a waveform of a current of the choke coil when the output current of the step-up/down type DC/DC converter is increased in the example shown in FIG. 6.

FIG. 7 is an explanatory diagram showing an example of a waveform of a current of the choke coil 915 when the output current of the step-up/down type DC/DC converter 9 is increased in the example shown in FIG. 6.

When the resistance value of the load resistor 11 is changed and the output current of the step-up/down type DC/DC converter 9 is increased to 20 A, the average current flowing through the choke coil 915 is increased to 20 A, but ΔI does not change at 4 A regardless of the increase in load current (see FIG. 7). As shown in FIG. 7, the current waveform of the choke coil 915 is a triangular wave which changes from the minimum of 18 A to the maximum of 22 A.

(5-2) Operating as Step-Up DC/DC Converter (Boost Converter)

Figure 8:
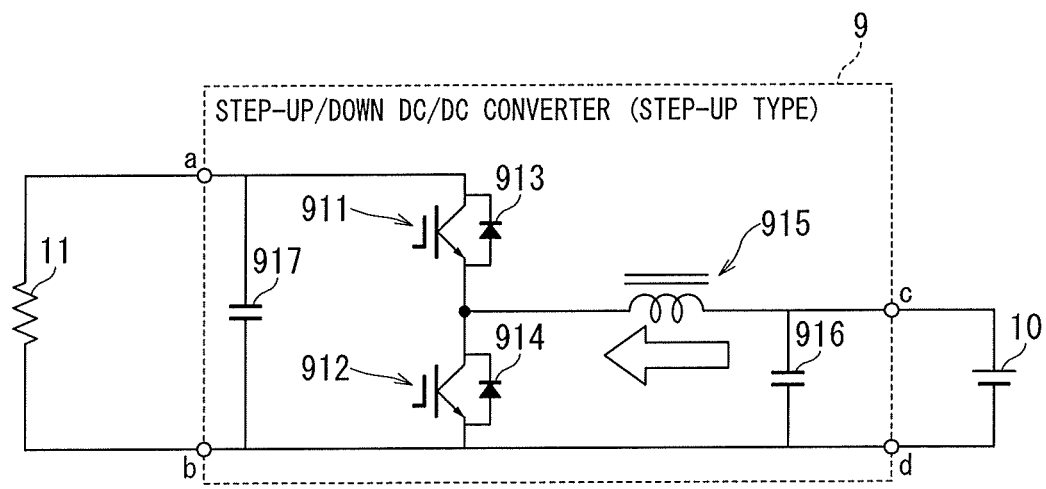
FIG. 8 is an explanatory diagram showing how a general step-up/down type DC/DC converter operates as a step-up type DC/DC converter.
Figure 9:
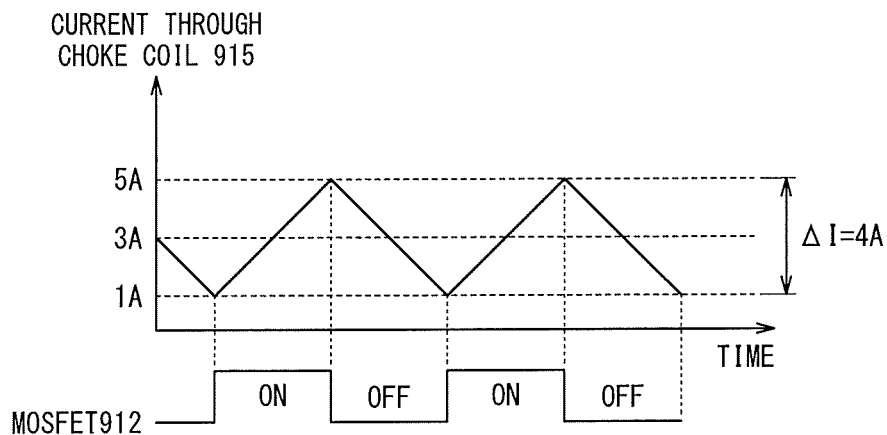
FIG. 9 is an explanatory diagram showing an example of a relationship between the current through the choke coil and a switching timing of the MOSFET when the step-up/down type converter operates as the step-up type DC/DC converter.

FIG. 8 is an explanatory diagram showing how a general step-up/down type DC/DC converter 9 operates as a step-up type DC/DC converter. FIG. 9 is an explanatory diagram showing an example of a relationship between the current through the choke coil 915 and a switching timing of the MOSFET 912 when the step-up/down type converter operates as the step-up type DC/DC converter. FIG. 9 shows an example of a waveform of a current through the choke coil 915 in a steady state where the voltage of the DC power supply 10 is 280V, the ratio Ton/T of the on time of the MOSFET 911 to the switching period is 0.5, and the output current is 3 A.

When the step-up/down type DC/DC converter 9 is operated as a step-up DC/DC converter, the DC power supply 10 is connected between the terminals c and d, and the load resistor 11 is connected between the terminals a and b. When the MOSFET 912 is on, the current flows from the DC power supply 10 to the choke coil 915 and the MOSFET 912, and the current of the choke coil 915 linearly increases (see FIG. 9).

When the MOSFET 912 is off, the current of the DC power supply 10 flows through the choke coil 915 and the diode 913 to the capacitor 917 and the load resistor 11. The voltage of the capacitor 917 and the load resistor 11 is the sum of the voltage of the DC power supply 10 and the voltage of choke coil 915. The voltage of the DC power supply 10 can therefore be boosted and supplied to the load resistor 11. In the example shown in FIG. 9, the output voltage of the step-up/down type DC/DC converter 9 is 560V, which is twice the input voltage, and the output current is 1.5 A, which is ½ of the input current. As shown in FIG. 9, as in FIG. 6, the current flowing through the choke coil 915 is a triangular wave that changes from 1 A to 5 A with 3 A at the center. For the sake of convenience, the direction of the current through the choke coil 915 is assumed to be reversed to that of FIG. 5 and the direction of flow from the capacitor 916 to the MOSFET 912 to be positive.

Figure 10:
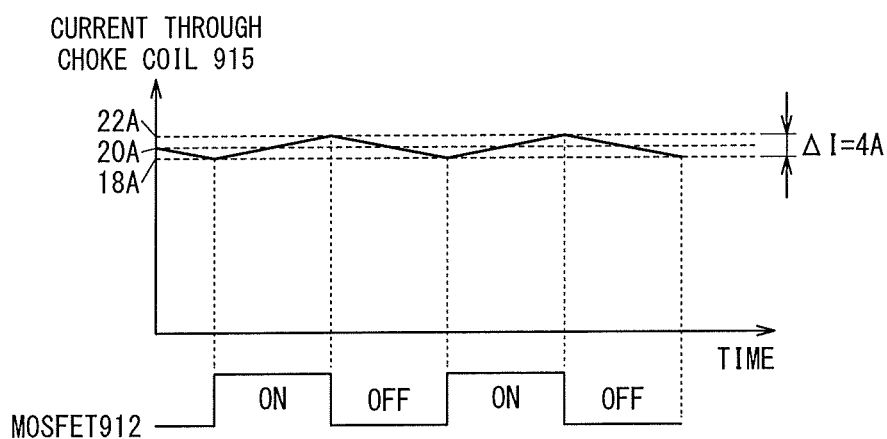
FIG. 10 is an explanatory diagram showing an example of a waveform of a current of the choke coil when the output current of the step-up/down type DC/DC converter is increased in the example shown in FIG. 9.

FIG. 10 is an explanatory diagram showing an example of a waveform of a current of the choke coil 915 when the output current of the step-up/down type DC/DC converter 9 is increased in the example shown in FIG. 9.

When the resistance value of the load resistor 11 is changed and the current of the DC power supply is increased to 20 A, a triangular wave current which changes from 18 A to 22 A with an average of 20 A flows in the choke coil 915, as the example shown in FIG. 7.

(5-3) Cause of Enlargement of Choke Coil of DC/DC Converter

Switching type DC/DC converters can generally be downsized by increasing the switching frequency. This is because increasing the switching frequency leads to a reduction in size of the choke coil and the capacitor. Conventionally, to realize a DC/DC converter of several dozen kW, an IGBT has been used as a switching element, but it is difficult in principle to increase the switching frequency of the IGBT. However, in recent years, MOSFETs using wide band gap semiconductors such as SiC and GaN have been put to practical use, and it becomes possible to increase the switching frequency to 100 kHz or more while handling a large amount of power. As a result, the transformer can be made much smaller than before.

However, the core of the choke coil of the DC/DC converter needs to be designed so as not to cause magnetic saturation even at its peak current. To deal with this issue, for example, in the circuit described with reference to FIGS. 5-10, it is necessary to design a magnetic circuit on the basis of the point at which the peak value of the current of the choke coil 915 is maximized, where the point is determined from the input/output conditions of step-up/down type DC/DC converter 9. However, as is apparent from FIGS. 7 and 10, when the load current increases, the superimposed DC current (the DC component of the current) in the choke coil 915 gets larger. As a result, the core of the choke coil 915 becomes large, and it becomes difficult to downsize the step-up/down type DC/DC converter 9.

That is, there is a property inhering in the operation principle of the DC/DC converter that a large direct current is superimposed on the choke coil when the output power of the DC/DC converter is increased. Hence, the choke coil is difficult to be downsized even if the switching frequency is increased. This is because the core size must be increased in order to prevent saturation of the core of the choke coil caused by the superimposed DC current, and as a result, the choke coil becomes heavy and large.

(6) Correction Winding of Choke Coil

To deal with the issue, in the X-ray high voltage apparatus 100 as an example of the power supply apparatus 100 according to the embodiments, the choke coil 515 is provided with a correction winding 518 for correcting the deviation of the magnetic flux caused by the superimposed DC current (see FIG. 4). A summed current based on the DC/DC converter is applied to the correction windings 518 to 5n8. For example, at least one of the current obtained by summing the output currents of the step-down DC/DC converter and the current obtained by summing the input currents of the step-up DC/DC converter is applied to the correction windings 518 to 5n8.

Further, at least one of the step-up DC/DC converter and the step-down DC/DC converter is the multi-phase converter configured by a plurality of converter blocks in which the blocks are operated in parallel with shifting the operation phase of each block. The available power can be increased by connecting in parallel at least one of the inputs and outputs of the multiple DC/DC converter blocks.

When the step-down DC/DC converter is the multi-phase converter, the current obtained by summing the output currents of the multi-phase converter is applied to the correction winding 518. When the step-up type DC/DC converter is the multi-phase converter, the current obtained by summing the input currents of the multi-phase converter is applied to the correction winding 518. The current obtained by summing at least one of the input currents and the output currents of a large number of DC/DC converters is applied to the correction winding 518 connected in series.

The sum of the input currents or output currents of multiple DC/DC converter blocks operating in parallel with different phases is a DC current with less ripple. Thus, it is possible to eliminate the deviation of the magnetic flux due to the superimposed DC current of the choke coil, and the core size of the choke coil can be reduced significantly compared to the prior art, for example, to about 1/10.

Note that the magnitude of the summed current is multiplied by the number of DC/DC converters, i.e., multiplied by n. Therefore, when the number of DC/DC converter blocks 51 to 5n is n, a winding turns ratio of the main winding to each of the correction windings 518 to 5n8 in each of the choke coil 515 to 5n5 in the DC/DC converter is preferably n:1.

FIG. 4 shows an example in which a single step-up/down type DC/DC converter 5 having both step-up and step-down functions is used as the multi-phase converter. In this case, when the step-up/down type DC/DC converter 5 operates as the step-down DC/DC converter, a current obtained by summing the output currents of the multi-phase converter (the DC/DC converter blocks 51 to 5n) is applied to the correction winding 518 when charging the power storage device 6. When the step-up/down type DC/DC converter 5 operates as the step-up DC/DC converter, a current obtained by summing the input currents of the multi-phase converter is applied to the correction winding 518 when the power storage device 6 is discharged.

Figure 11A:
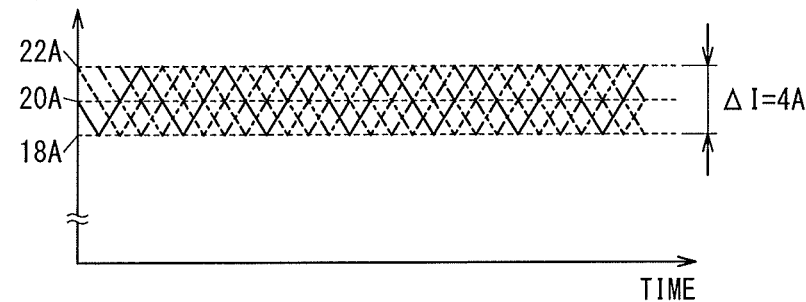
FIG. 11A is an explanatory diagram showing an example of waveforms of currents each of which flows through each main winding of the choke coil of the DC/DC converter block shown in FIG. 4.
Figure 11B:
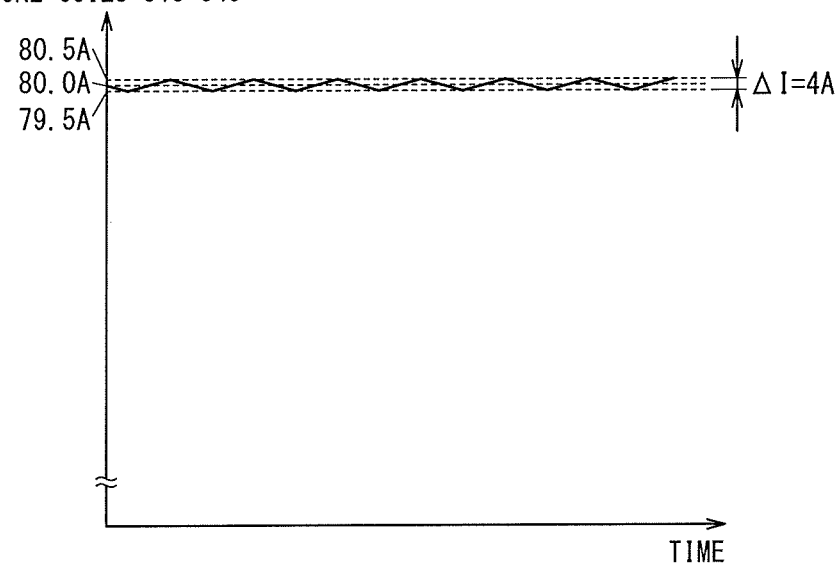
FIG. 11B is an explanatory diagram showing an example of a waveform of a current obtained by summing the currents each of which flows through each main winding of the choke coil.

FIG. 11A is an explanatory diagram showing an example of waveforms of currents each of which flows through each main winding of the choke coils 515 to 5n5 of the DC/DC converter blocks 51 to 5n shown in FIG. 4. FIG. 11B is an explanatory diagram showing an example of a waveform of a current obtained by summing the currents each of which flows through each main winding of the choke coils 515 to 5n5.

In FIGS. 11A and 11B, an example is shown in which the step-up/down type DC/DC converter 5 shown in FIG. 4 is operated as the step-down DC/DC converter, each of the output currents of the DC/DC converter blocks 51 to 5n is set to 20 A, and the number of DC/DC converter blocks n is 4.

Taking the DC/DC converter block 51 as an example, the current waveform of the main winding of the choke coil 515 is a triangular that increases when the MOSFET 511 is on and falls when the MOSFET 511 is off. This is exactly the same as the operation of the general step-down DC/DC converter described with reference to FIGS. 5 to 7, where L is the inductance of the main winding of choke coil 515.

As shown in FIG. 11A, when the number of the DC/DC converter blocks n is 4 and each output current of the DC/DC converter blocks 51 to 54 is set to 20 A, each current flowing through each main winding of the choke coils 515 to 545 is a triangular wave current which changes from 18 A to 22 A with an average of 20 A and has the same waveform shown as the waveform shown in FIG. 7.

Meanwhile, when the currents flowing in the choke coils 515 to 545 are summed, the summed current changes from the minimum of 79.5 A to the maximum of 80.5 A with an average of 80 A, and the waveform of the summed current is close to that of a DC current (see FIG. 11B). In FIG. 4, the output terminals c and d of the DC/DC converter blocks 51 to 5n are connected in parallel as shown in the figure, and connected to the filter circuit 501. Hence, the input current of the filter circuit 501 has a waveform as shown in FIG. 11B, and the filter circuit 501 outputs a DC current whose ripple is further reduced by the function of the filter.

(7) Operation of Circuit Including Terminals e and f of DC/DC Converter Block

Next, the operation of the circuit formed by the terminals e and f of the DC/DC converter block 51 shown in FIG. 4 will be described.

Figure 12:
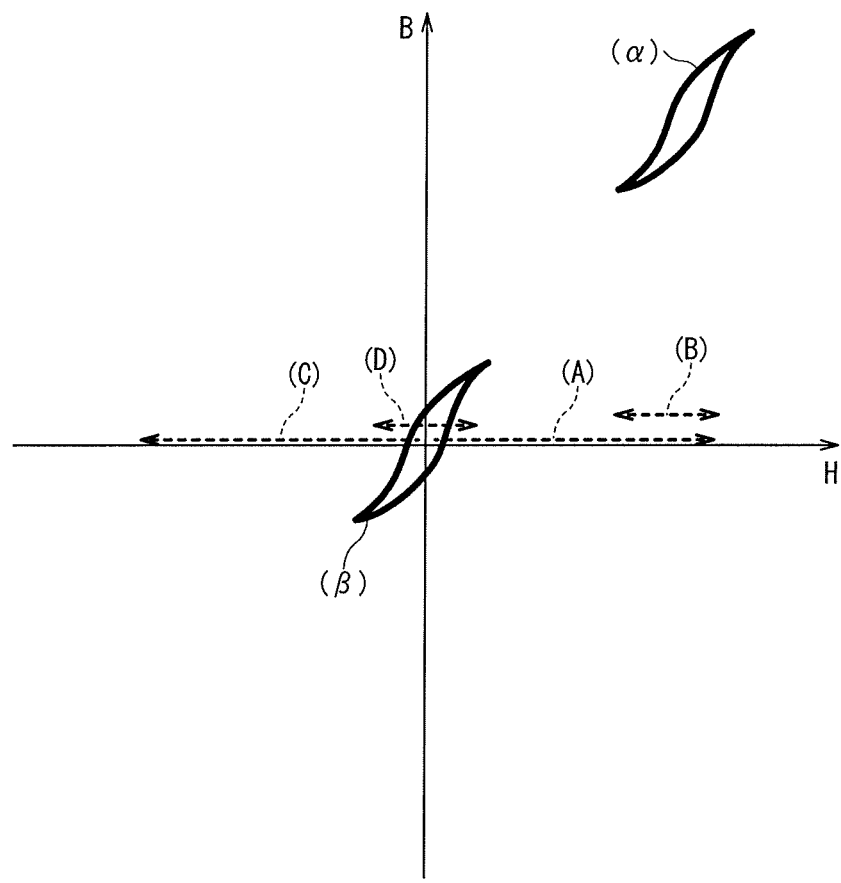
FIG. 12 is an explanatory diagram showing a relationship between the magnetic flux density B and the magnetic field H of the choke coil.

FIG. 12 is an explanatory diagram showing a relationship between the magnetic flux density B and the magnetic field H of the choke coil 515.

The terminals e and f are connected to the correction winding 518 of the choke coil 515 inside the DC/DC converter block 51, and the output of the filter circuit 501 is connected to the terminal e. The correction winding 518 of the choke coil 515 is provided so as to be opposite to the main winding in polarity. The main winding produces a magnetic field (A). A change of the magnetic field (A) is shown in FIG. 12 as (B). The current of n times the main winding flows in the correction winding 518, and the winding turns ratio of the main winding to the correction winding 518 is n:1, and thus, as indicated by (C) in FIG. 12, the magnetic field generated by the correction winding 518 has the opposite direction to the magnetic field (A) generated by the main winding, and the magnitude thereof is the same as the average value of the magnetic field (A) generated by the main winding.

Therefore, the change in the magnetic field in the core of choke coil 515 shifts in positive and negative around zero as indicated by (D) in FIG. 12. When correction winding 518 is not provided with the choke coil 515, a B-H curve of the core of the choke coil 515 draws a loop in a region of high magnetic flux density far from the origin of the B-H graph (the intersection of the magnetic flux density and the magnetic field) as indicated by (a) in FIG. 12, as in the case of the choke coil 915 of the general DC/DC converter 9 shown in FIG. 5.

Meanwhile, in the choke coil 515 of the DC/DC converter block 51 according to the present embodiments, the DC current component of the magnetic field generated by the main winding is canceled by the DC current (see FIG. 11B) flowing through the correction winding 518. Therefore, a B-H curve of the core of the choke coil 515 draws a loop centered on the origin of the graph as indicated by (13) in FIG. 12.

As shown in FIG. 4, since terminals e and f of the DC/DC converter blocks 51 to 5n are connected in series, currents flowing through terminals e and f of the DC/DC converter blocks 51 to 5n are equal. Therefore, each of the B-H curves of the cores of the choke coils 525 to 5n5 in the DC/DC converter blocks 52 to 5n also has a loop centered on the origin of the graph as indicated by (β) in FIG. 12. The current flowing out the terminal f of the DC/DC converter block 5n charges the power storage device 6 via the current detection circuit 503.

(8) Power Assisting Operation

Next, an operation for supplementing shortage of the power (power assisting) of the AC power supply 1 with the energy stored in the power storage device 6 in the case of irradiating X-rays with a power exceeding the capacity of the AC power supply 1 will be described.

When supplementing the power of the AC power supply 1, the DC/DC converter blocks 51 to 5n in the step-up/down type DC/DC converter 5 shown in FIG. 4 operate as a step-up converter. In this case, the input terminals of the DC/DC converter blocks 51 to 5n are the terminals c and d, and the output terminals are the terminals a and b. The current flowing out of the positive terminal of the power storage device 6 passes through the current detection circuit 503 to the terminal f of the DC/DC converter block 5n. Since the terminals f and e of the DC/DC converter blocks 51 to 5n are connected in series, the current flowing out of the power storage device 6 reaches the terminal e of the DC/DC converter block 51, and passes through the filter circuit 501 to the input terminal c of the DC/DC converter block 51 to 5n.

Meanwhile, the input terminal d is connected to the negative terminal of the power storage device 6. Thus, the power storage device 6 is connected to the input terminals c and d of the DC/DC converter blocks 51 to 5n through the current detection circuit 503, the terminals f and e of the DC/DC converter blocks 51 to 5n, and the filter circuit 501.

When the MOSFET 512 in the DC/DC converter block 51 performs switching operation and when the MOSFET 512 is on, the current flows from the terminal c to the terminal d via the main winding of the choke coil 515 and the MOSFET 512. Then, turning off the MOSFET, the current flowing in the main winding of the choke coil 515 is applied out of the step-up/down type DC/DC converter 5 via the diode 513, the terminal a of the DC/DC converter block 51, and the current detection circuit 504, and returns to the terminal b of the DC/DC converter block 51. Since the MOSFETs 522 to 5n2 in the DC/DC converter blocks 52 to 5n perform switching operation at the same frequency while shifting the phase with each other, an output obtained by boosting the voltage of the power storage device 6 is applied to the output terminals a and b of the DC/DC converter blocks 51 to 5n, and is applied to the inverter circuit 3 (see FIG. 3) via the current detection circuit 504.

The current flowing in the correction coils 518 to 5n8 of the choke coils 515 to 5n5 connected to the terminals e and f of the DC/DC converter blocks 51 to 5n cancels the DC component of the magnetic field generated by the main coils of the choke coil 515 to 5n5, as in the case of the step-up/down type DC/DC converter 5 operating as the step-down type DC/DC converter.

For example, when the number of the DC/DC converter blocks is 4 and the current taken out of the power storage device 6 is 80 A, the average current is a triangle wave of 20 A because each current flowing from each of the choke coils 515 to 51n into the corresponding main winding is 80 A/n=20 A. This is the same as the current waveform shown in FIG. 11A, and the waveform obtained by summing the input currents of the DC/DC converter blocks 51 to 5n is also as the same as shown in FIG. 11B. Hence, in the choke coil 515 to 5n5 in the DC/DC converter blocks 51-5n, the DC component of the magnetic field generated by the main winding of the choke coil is canceled by the current flowing in the correction windings 518-5n8, and the B-H curve of the core draws a loop centered on the origin of the graph like the loop indicated by (β) in FIG. 12.

In the above description, although the example in the case where the number n of the DC/DC converter blocks n is 4 is mainly described, the number is not limited to four. For example, in the case of n=8, the ripple of the current obtained by summing the input and/or output currents of the DC/DC converter blocks 51 to 58 is further reduced. In this case, the filter circuit 501 may be made smaller or omitted.

Further, a High frequency current with small amplitude at n times switching frequency and a large DC current flow in the coil of the filter circuit 501. Thus, the core material can be downsized by using, for example, a silicon steel plate having a high saturation magnetic flux density. Furthermore, in the same way as the correction windings 518 to 5n8 for the choke coil 515 to 5n5, the correction winding (filter correction winding) for the filter may be provided to correct the deviations of the magnetic flux caused by the superimposed DC current on the coil of filter circuit 501. In this case, when the deviation is corrected by constant current control, the filter circuit 501 can be further downsized.

Although an example in which the X-ray high voltage apparatus 100 is used as the power supply apparatus 100 in the above description, the present invention is not limited to the example. At least one of a step-up DC/DC converter and a step-down DC/DC according to the embodiments shown above, for example, the step-up/down type DC/DC converter 5 shown in FIG. 4, applicable to apparatuses which take in and out energy from a power storage device by regenerating energy to the power storage device. This type of apparatuses includes, for example, a mechanism that assists a hydraulic pressure for driving a building machine with the power of an electric motor. In such a mechanism, energy may be regenerated to the power storage device when the machine shutting down, and thus, the DC/DC converter according to the present embodiments is applicable. Further, there are vehicles that assist the engine power with electricity at the time of acceleration, and use a regenerative brake at the time of deceleration to recover energy to the power storage device. This type of vehicle also includes an apparatus for taking in and out energy from the power storage device, and the DC/DC converter according to the present embodiments can be applied to the apparatus included in the vehicle.

According to the power supply apparatus 100 of the present embodiments, each of the correction windings 518-5n8 that is opposite to the main winding in polarity is provided for each of the choke coils 515 to 5n5 in the step-up/down type DC/DC converter 5 charging and discharging the power storage device 6. Thus, the deviation of the magnetic flux caused by the DC current superimposed on the main winding can be corrected, and the choke coils 515 to 5n5 can be downsized significantly.

For example, when the X-ray high voltage apparatus 100 is used for an X-ray CT apparatus, both the power storage device 6 and the step-up/down type DC/DC converter 5 can be mounted on a rotating frame. In this case, according to the X-ray high voltage apparatus 100 according to the present embodiments, it is possible to provide an X-ray CT apparatus that is capable of obtaining an output larger than that of the external power supply 1, is compact, and has a small footprint. With the X-ray CT apparatus, diagnosis using a high-performance device is possible even in a place where the restriction of the external power supply 1 or the restriction of the size of the device is severe such as a medical treatment room located in a building.

According to at least one of the above-described embodiments, the choke coils 515 to 5n5 of the DC/DC converter 5 for charging and discharging the storage device 6 can be downsized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray high voltage apparatus comprising:
   an AC/DC converter converting an alternating-current (AC) voltage into a direct-current (DC) voltage;
   an inverter circuit converting the DC voltage outputted by the AC/DC converter into an AC voltage;
   a high voltage generator externally outputting a power obtained by boosting and rectifying the AC voltage outputted by the inverter circuit;
   a power storage device; and
   the DC/DC converter receiving the DC voltage outputted by the AC/DC converter, and charging and discharging the power storage device, wherein
   the DC/DC converter is a multi-phase converter including a plurality of DC/DC converter blocks,
   each of the plurality of DC/DC converter blocks includes each of choke coils,
   the each choke coil is provided with each of correction windings for correcting a deviation of a magnetic flux caused by a DC current superimposed on the each corresponding choke coil, and
   the correction windings are applied with a summed current based on the DC/DC converter.

2. The X-ray high voltage apparatus according to claim 1, wherein
   when charging the power storage device, the summed current is obtained by summing the output currents of the DC/DC converter and is applied to the correction windings, and
   when discharging the power storage device, the summed current is obtained by summing the input currents of the DC/DC converter and is applied to the correction windings.

3. The X-ray high voltage apparatus according to claim 1, wherein
   the each correction winding of the each corresponding choke coil of the multi-phase converter is opposite in polarity to a main winding of the each corresponding choke coil, and
   the correction windings are connected in series.

4. The X-ray high voltage apparatus according to claim 3, wherein, when the number of the DC/DC converter blocks of the multi-phase converter is N, the winding turns ratio of the main winding to the correction winding of the each choke coil of the multi-phase converter is N to 1.

5. The X-ray high voltage apparatus according to claim 4, wherein the multi-phase converter operates such that each operation phase of the each of the plurality of DC/DC converter blocks is shifted by $2\pi/N$ with each other.

6. The X-ray high voltage apparatus according to claim 1, further comprising a filter circuit that includes at least a coil and removes high frequency noise components from outputs of the plurality of DC/DC converter blocks,
    wherein the coil of the filter circuit includes a filter correction winding for correcting a deviation of a magnetic flux caused by a DC current superimposed on the coil, and
    the summed current based on the DC/DC converter is applied to the filter correction winding.

7. An X-ray imaging apparatus comprising:
the X-ray high voltage apparatus according to claim 1;
an X-ray source configured to be applied the output power of the high voltage generator to generate X-rays and irradiate the generated X-rays onto an object; and
an X-ray detector configured to detect the X-rays passing through the object.

8. A power supply apparatus comprising:
an AC/DC converter converting an AC voltage into a DC voltage;
an inverter circuit converting the DC voltage outputted by the AC/DC converter into an AC voltage;
a high voltage generator externally outputting a power obtained by boosting and rectifying the AC voltage outputted by the inverter circuit;
a power storage device; and
the DC/DC converter receiving the DC voltage outputted by the AC/DC converter, and charging and discharging the power storage device, wherein
the DC/DC converter is a multi-phase converter including a plurality of DC/DC converter blocks,
each of the plurality of DC/DC converter blocks includes each of choke coils,
the each choke coil is provided with each of correction windings for correcting a deviation of a magnetic flux caused by a direct current superimposed on the each corresponding choke coil, and
the correction windings are applied with a summed current based on the DC/DC converter.

9. The power supply apparatus according to claim 8, wherein
    when charging the power storage device, the summed current is obtained by summing the output currents of the DC/DC converter and is applied to the correction windings, and
    when discharging the power storage device, the summed current is obtained by summing the input currents of the DC/DC converter and is applied to the correction windings.

* * * * *